United States Patent
Fricker

[15] 3,683,250
[45] Aug. 8, 1972

[54] TIMED INDUCTION MOTOR START SWITCH UTILIZING POSITIVE TEMPERATURE COEFFICIENT THERMISTOR AND SEMICONDUCTOR SWITCHING DEVICE

[72] Inventor: David C. Fricker, Hurst, Tex.
[73] Assignee: ECC Corporation, Euless, Tex.
[22] Filed: July 29, 1970
[21] Appl. No.: 59,303

[52] U.S. Cl............318/221 E, 318/227, 318/229, 323/36
[51] Int. Cl..................................H02p 1/44
[58] Field of Search......318/221 R, 221 E, 227, 229; 323/22 SC, 36, 39

[56] References Cited

UNITED STATES PATENTS

| | | | |
|---|---|---|---|
| 3,479,560 | 11/1969 | Paget et al. | 323/36 UX |
| 3,517,259 | 6/1970 | Dotto | 323/36 X |
| 3,519,911 | 7/1970 | Frank | 318/221 R |
| 3,548,290 | 12/1970 | Swinehart | 323/36 X |
| 3,530,348 | 9/1970 | Conner | 318/227 X |
| 3,495,150 | 2/1970 | Enemark | 318/221 R |

*Primary Examiner*—Gene Z. Rubinson
*Attorney*—Giles C. Clegg, Jr.

[57] ABSTRACT

An electronic switch circuit for controlling the start operation of a single phase induction motor of the timed start type in which the start winding is disconnected a controllable time interval after the start cycle is initiated. A symmetrical conductor switching device is used for providing the switching function with the switching device being switched to a low impedance state, effectively connecting the start winding in circuit, when a charging device is charged to a predetermined level. A positive temperature coefficient thermistor is used for varying the voltage supplied to charge a charging capacitor and to vary the time constant of the charging capacitor. A phase shift capacitor connected in series with the charging capacitor causes the charging current of the charging capacitor to lead that of the applied line voltage and permit the switching device to be rendered conductive in a desired time relationship with the voltage supplied to the motor.

12 Claims, 4 Drawing Figures

PRIOR ART

PATENTED AUG 8 1972 3,683,250

INVENTOR
DAVID C. FRICKER

*ATTORNEY*

TIMED INDUCTION MOTOR START SWITCH UTILIZING POSITIVE TEMPERATURE COEFFICIENT THERMISTOR AND SEMICONDUCTOR SWITCHING DEVICE

BACKGROUND OF THE INVENTION

The present invention relates to switching circuits and more particularly to a switching circuit especially adapted for use in the starting circuit of a single phase induction motor.

Single phase induction motors and the operation thereof are well known in the art. Such motors are generally classified in accordance with and identified by the method of starting. For example, typical motors are referred to as split phase or capacitor start-capacitor run or capacitor start-induction run. Typically the appropriate line voltage is applied across the single phase induction motor and a branch circuit containing a starting reactance is utilized to produce starting torque. After the motor has been started and a suitable operating condition is achieved, the branch circuit is effectively removed (i.e. electrically disconnected) from the circuit. Thereafter, the motor continues to run with force provided by the main winding.

In the prior art devices, the starting reactance is usually disconnected from the circuit by means of a mechanical switch conventionally operated by centrifugal force or by a current operated relay. Each of these disconnect methods are characterized by inherent difficulties relating to size, reliability and operational tolerance.

SUMMARY OF THE INVENTION

The present invention provides an electronic switching circuit especially adaptable for use in disconnecting the starting reactance from a single phase induction motor after starting is accomplished. The electronic switch of the invention is at least equally as the old switches for performing similar functions, and has improved operating characteristics and reliability relative to operation of the motor. The circuit of the present invention can be formed as a very small thick or thin film circuit.

In accordance with the present invention, a symmetrical switching means of conventional type is connected in series with a utilization means, in this specific example of the invention the starting reactance, and a source of alternating supply voltage. A series circuit comprising a phase shift capacitor and charging capacitor receives an alternating potential which is derived from the supply voltage by a reference voltage means. A control signal is applied to the symmetrical switch when the charge on the charging capacitor attains a predetermined level, causing the symmetrical switch to switch to a quasi-stable low impedance state from its normal high impedance state to remain in the low impedance state until the current flowing through the device falls below a latching level. In accordance with the preferred embodiment of the invention, the reference voltage means comprises first and second resistors, one of which is characterized by having a positive temperature coefficient and a very low thermal time constant. The resistance means having the low thermal time constant and positive temperature coefficient is connected in the charge path of the charging capacitor, preferably through the phase shift capacitor and an additional resistor connected between the two capacitors.

In operation of the circuit, when power is first applied to the motor, the symmetrical switching device will be switched to the low impedance state at virtually the zero crossing point of each half cycle of applied supply voltage. Once the supply voltage is applied to the motor, however, the resistance of the positive temperature coefficient resistance element will be increased, decreasing the potential available to charge the capacitor thereby increasing the time required for the capacitor to be charged to the predetermined level each half cycle. The thermal mass of the positive temperature coefficient resistor is chosen such that after a predetermined time interval sufficient for the motor to attain operating speed, the symmetrical switching means will not be switched to the low impedance state during part of any half cycle and the starting reactance will effectively be disconnected from the motor circuit.

Many objects and advantages of the invention will become apparent to those skilled in the art as a detailed description of the invention unfolds in conjunction with the appended drawings wherein like reference numerals denote like parts and in which:

DESCRIPTION OF THE DRAWINGS

Referring now to FIGS. 1a — 1c there is shown schematic representations of three most common types of single phase induction motors, the capacitor start-capacitor 1 of FIG. 1a, the split phase motor of FIG. 1b, and the capacitor start-induction run of FIG. 1c. Each of the motors can be seen to be similar in that they include a rotor 10 and a field winding 12. The field winding 12 is connected across the supply voltage through a switch 14 and lines 20 and 22. Connected in shunt with the field winding 12 through a switch 18 is a starting reactance 16. As shown in FIG. 1a, the starting reactance of a capacitor start-capacitor run motor is the capacitor 30. The starting reactance 16 of a split phase motor, as shown in FIG. 1b is a winding 32. The starting reactance of a capacitor start-inductive run motor, as shown in FIG. 1c is a capacitor 34 connected in series with a winding 36. It will be noted, in this regard, that the capacitor start-capacitor run motor of FIG. 1a further includes another shunt circuit comprising a series connected inductor 27 and capacitor 29 which are not affected by operation of the switch 18. It will be further noted that the switch 16 represents a centrifugal or current relay switch as is known in the art.

In normal operation alternating supply voltage is applied to the motor when switch 14 is closed. Initially, current passes through the starting reactance with the voltage across the winding 12 lagging the voltage across the other winding associated with the particular motor, thus producing a strong two phase rotating field, in turn producing a high starting torque. When the motor reaches a proper operating speed, switch 18 opens and removes power from the starting reactance. Reference can be made to any standard text on electrical machinery for a detailed analysis of the torque speed characteristics of such motors. Exemplary of such text is one entitled "Electrical Machinery" by Fitzgerald and Kingsley published by McGraw-Hill.

Figure 1A:
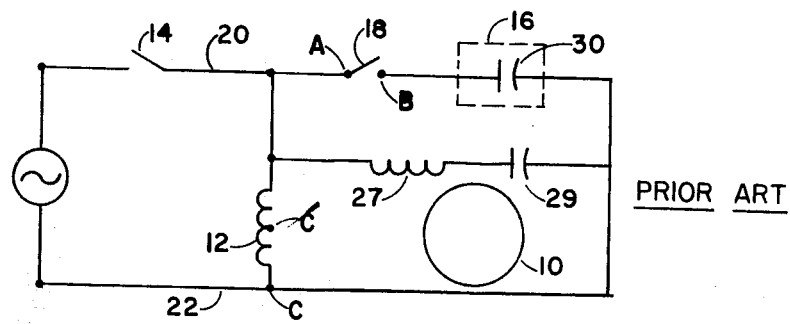
FIGS. 1a — 1c are schematic representations of the typical single phase induction motors with a switch in the starting reactance circuits; and, FIG. 2 is a schematic diagram illustrating a preferred electronic switching circuit in accordance with the present invention.
Figure 1B:
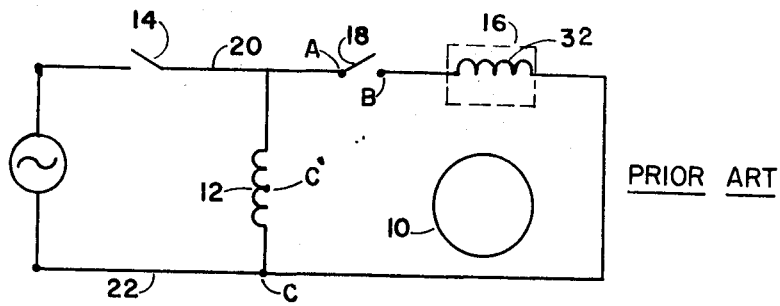
Figure 1C:
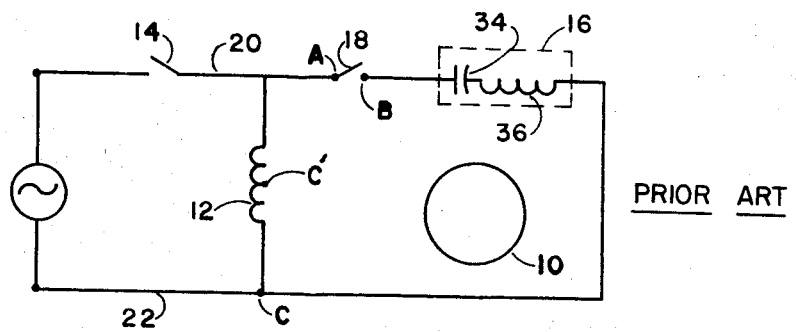
Figure 2:
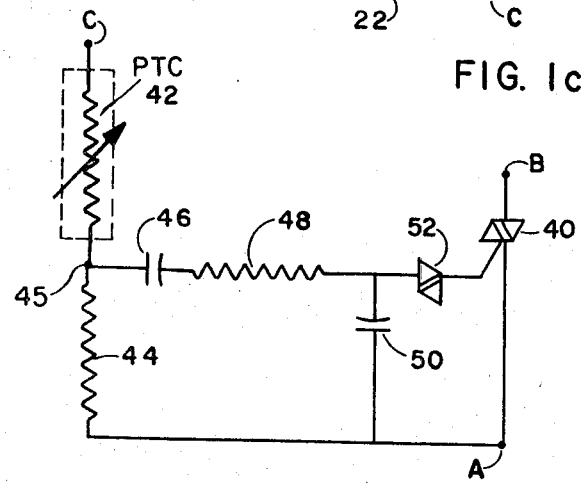

There is shown in FIG. 2 of the drawing a schematic diagram of an electronic circuit in accordance with the present invention which can be utilized instead of the switch 18 of FIGS. 1a — 1c. The circuit of FIG. 2 includes a symmetrical A.C. switch 40 of a type well known in the art. Thus, the device 40 includes a pair of power electrodes which are connected to terminals A and B, for connecting the circuit to a replace switch 18 of FIGS. 1a — 1c. The device 40 is one which normally exhibits a high impedance between the higher terminals connected to terminals A and B, but which is switched to a quasi-stable low impedance state when a control signal is applied thereto and which remains in the low impedance state so long as latching current flows through the device. It will be noted in this regard, that there are several different types of degenerative switching device which can be used, such as two oppositely poled silicon controlled rectifiers. The device 40 further includes a control electrode which is connected to one side of diode switching device 52.

The circuit of FIG. 2 further includes means for developing a reference voltage comprising a resistive element 42 having a positive temperature coefficient and a resistor 44 connected in series. Preferably the device 42 has a much higher temperature coefficient than the resistor 44. The means for developing a reference voltage is connected between terminals A and C or A and C' of the motors of FIGS. 1a — 1c. It may be desirable to connect the voltage reference circuit between terminal A and a tap indicated at C' of the main field winding 12 when the line voltage is in excess of a desired level with the field winding 12 functioning as a voltage divider. There is also provided a series circuit comprising a capacitor 46, a resistor 48 and a second capacitor 50. The series circuit divider is connected between terminal A and juncture 45 which lies between resistor 42 and resistor 44. Juncture 51 between resistor 48 and capacitor 50 are connected to the other side of the diode switching element 52.

In the circuit of FIG. 2, it is desirable that capacitor 46 be of a greater capacitance than the capacitor 50. In one exemplary circuit, capacitor 46 was chosen to have a capacitance of 0.047 microfarads and capacitor 50 was chosen to have a capacitance of 0.01 microfarads. Resistor 48 provides a current limiting function, and in accordance with the specific circuit being described was chosen to have a resistance of 12,000 ohms.

When voltage is supplied across terminals A and C, or C' as the case may be, current will flow through resistors 42 and 44 providing a reference voltage at juncture 45. It will be noted, in this regard, that an important function provided by resistor 44 in addition to establishing the potential appearing at juncture point 45 is to permit additional flow of current to produce heat in resistor 42 and a resultant increase in the resistance of device 42. In the specific example of the invention being described, resistor 44 was chosen to have a resistance of 1,800 ohms. The resistive element 42 was chosen to have an initial resistance of approximately 600 ohms at room temperature. It can be readily seen that when switch 14 initially closed, a substantial portion of the instantaneous line voltage will appear at juncture point 45 and that capacitor 50 will be charged to the break-over voltage of 52, which is suitably in the order of 35 volts very rapidly. An important feature of the invention is that provision of capacitor 46, which is substantially larger than capacitor 50, causes the potential produced across capacitor 50 to actually lead the applied line voltage by an amount sufficient to cause the diode break-over device 52 to switch from its normally high impedance state to a low impedance state at or near the time that the voltage impressed across terminals A and B attains a level sufficient to provide latching current to the device 40. Maximum power is thereby applied to the starting reactance when switch 14 is first closed.

As a result of heating of the resistive device 42, its resistance will increase, decreasing the potential appearing at juncture 45 and increasing the time required for the capacitor 50 to charge to the break-over voltage of the device 52. The device 40 will be permitted to conduct for decreasing times of each half cycle as the resistance of the device 42 increases. After the device 42 has been heated sufficiently that its resistance increases to a level, approximately 12,000 ohms in this specific example described, at which capacitor 50 is not charged to the break-over voltage of device 52 during a half-cycle, the device 40 will not be switched to the low impedance state during the half-cycle and the starting reactance will be effectively disconnected from the circuit.

The time required for the resistive element 42 to be heated to an extent that its resistance will increase to a level at which device 40 will not be switched to a low impedance state depends upon the temperature coefficient of the device and its thermal time constant. The thermal time constant of the device 42 will also effect the time that the motor must remain off before a new start cycle can be initiated. Thus, it is desirable that the thermal time constant of the device 42 be chosen such that after a period of time sufficient for the motor to obtain a desired operating speed the device 40 will not be switched to the low impedance state for a substantial portion of any half-cycle, and, further, that after the motor stops at least a desired amount of time be required before the resistance of the element 42 is decreased to a level sufficient to produce starting of the motor. The thermal mass and thermal resistance of the device 42 determines its thermal time constant in accordance with well known principles.

Although the invention has been described with reference to a particular preferred embodiment thereof, many changes and modifications will become apparent to those skilled in the art in view of the foregoing description which is intended to be illustrative and not limiting of the invention defined in the claims.

I claim:

1. A motor start switch circuit comprising:
   a. a symmetrical switching means including a gate electrode and first and second power electrodes, said switching means normally exhibiting a high impedance between said first and second power electrodes but being switched to a quasi-stable low impedance state when a control signal is applied to its gate electrode and remaining in the low impedance state until the current flowing through the power electrodes falls below a latching level;

b. means for connecting said symmetrical switching means by said first and second power electrodes in series with a motor start impedance means and a source of alternating supply voltage;

c. a charging capacitor for developing a potential thereacross;

d. reference voltage means for applying to said charging capacitor an alternating potential derived from said voltage source;

e. a phase shift capacitor coupled between said charging capacitor and said reference voltage means for advancing the potential developed across said charging capacitor;

f. means for supplying a control signal to the gate electrode of said symmetrical switching means responsive to the charge on the charging capacitor attaining a predetermined level, g. said reference voltage means including at least one positive temperature coefficient impedance means, which is heated as a result of current flow through the reference voltage means, h. the capacitance of the phase shift capacitor being sufficiently large with respect to the charging capacitor to cause the charging capacitor to be charged to the predetermined level at or shortly after the zero crossing point of the applied voltage when the resistance of the positive temperature coefficient impedance means is that corresponding to the beginning of a start cycle.

2. A switch circuit as defined in claim 1 wherein said means for supplying a control signal comprises a symmetrical diode break-over device connected to supply a control signal to the gate electrode of said symmetrical switching means responsive to said charging capacitor being charged to a voltage at least as great as the breakover voltage of said diode device.

3. A switch circuit as defined in claim 1 further including resistive means connected between said phase shift and charging capacitors for limiting current supplied to charge said charging capacitor and as a control signal.

4. A switch circuit as defined in claim 3 wherein the capacitance of said phase shift capacitor is greater than the capacitance of the charging capacitor.

5. A switch circuit as defined in claim 1 wherein the thermal time constant of said positive temperature coefficient impedance means is such that a predetermined time after power is applied to said switch circuit the impedance of said impedance means will increase sufficiently that the charging capacitor will not charge to the pre-determined level during a half-cycle.

6. In combination, a. a single phase alternating current motor including a run winding and a starting reactance connected in parallel across two lines of a source of alternating current supply voltage;

b. a symmetrical switching means including a gate electrode and first and second power electrodes, said switching means normally exhibiting a high impedance between said first and second power electrodes but being switched to a quasi-stable low impedance state when a control signal is applied thereto and remaining in the low impedance state until the current flowing through the power electrodes falls below a latching level;

c. means connecting said switching means by said power electrodes in series between said starting reactance and one of said lines;

d. a charging capacitor for developing a potential thereacross;

e. reference voltage means for applying to said charging capacitor an alternating potential derived from said voltage source;

f. a phase shift capacitor coupled between said charging capacitor and said reference voltage means for advancing the potential developed across said charging capacitor;

g. means for supplying a control signal to said gate electrode of the symmetrical switching means responsive to the charge on the charging capacitor attaining a predetermined level; and h. said reference voltage means including a positive temperature coefficient resistance device connected in the charge path of said charging capacitor.

7. A combination as defined in claim 6 wherein said reference voltage means comprises said positive temperature coefficient device and resistor means connected between said one line and a point of different potential.

8. A combination as defined in claim 7 wherein said positive temperature coefficient device and resistor means are connected across the two lines of the supply voltage.

9. A combination as defined in claim 7 wherein the positive temperature coefficient device and resistor means are connected across the one line and a tap on the run winding.

10. A combination as defined in claim 6 wherein the thermal time constant of said positive temperature coefficient device is such that a predetermined time after power is applied to said switch circuit the impedance of said device will increase sufficiently that the charging capacitor will not charge to the pre-determined level during a half-cycle.

11. A combination as defined in claim 6 further including resistive means connected between said first and second capacitor.

12. A combination as defined in claim 11 wherein the capacitance of said phase shift capacitor is greater than the capacitance of the charging capacitor.

* * * * *